US011906467B2

(12) United States Patent
Downey et al.

(10) Patent No.: US 11,906,467 B2
(45) Date of Patent: Feb. 20, 2024

(54) ACOUSTIC MEASUREMENT APPARATUS, KIT, AND METHOD OF USE THEREOF

(71) Applicant: Pliteq Inc., Toronto (CA)

(72) Inventors: Paul Charles Downey, Toronto (CA); Paul Gartenburg, Toronto (CA)

(73) Assignee: Pliteq Inc., Toronto (CA)

( * ) Notice: Subject to any disclaimer, the term of this patent is extended or adjusted under 35 U.S.C. 154(b) by 0 days.

(21) Appl. No.: 17/555,942

(22) Filed: Dec. 20, 2021

(65) Prior Publication Data

US 2023/0194476 A1   Jun. 22, 2023

(51) Int. Cl.
*G01N 29/04* (2006.01)

(52) U.S. Cl.
CPC ..... *G01N 29/045* (2013.01); *G01N 2291/023* (2013.01); *G01N 2291/028* (2013.01)

(58) Field of Classification Search
CPC . G01M 7/08; G01N 2203/0658; G01N 3/303; G01N 2291/023; G01N 2291/028; G01N 29/045–046
See application file for complete search history.

(56) References Cited

U.S. PATENT DOCUMENTS 3,266,289 A * 8/1966 Stamy .................. G01N 3/303
                                                      73/82
3,859,841 A * 1/1975 Evans .................. G01N 3/303
                                                     73/11.04
8,327,709 B2 * 12/2012 Daraio ............... G01N 29/2437
                                                      73/632
10,527,531 B2 * 1/2020 Peddle .................. G01N 3/303
2010/0024519 A1 * 2/2010 Zhang .................. G01N 3/303
                                                      73/12.01

(Continued)

FOREIGN PATENT DOCUMENTS

CN    106124153 A  * 11/2016  ............. G01M 7/08
CN    106289961 A  *  1/2017  ............. G01N 3/06
CN    106324097 A  *  1/2017  ........... G01N 29/045

(Continued)

OTHER PUBLICATIONS

Straub, Screen captures from YouTube video clip entitled "Ball Drop Tube", 7 pages, uploaded on Dec. 2, 2014 by user "Cool Science". Retrieved from Internet: < https://www.youtube.com/watch?v=zG3a1vZ11Rg&t=2s>. (Year: 2014).*

(Continued)

*Primary Examiner* — David L Singer
(74) *Attorney, Agent, or Firm* — Rowand LLP

(57) ABSTRACT

Kits, apparatuses, and methods are provided for measuring acoustic properties of a surface. In an implementation, a kit may be provided. The kit may comprise an elongated pin; a tube having first and second ends, the tube having at least one pair of diametrically opposing holes, the at least one pair of diametrically opposing holes operable to support the elongated pin therethrough; a mass adapted to be received through the first and second ends of the tube; wherein placement of the elongated pin through a first pair of the at least one pair of diametrically opposing holes may prevent movement of the mass through the tube; and wherein removal of the elongated pin through the first pair of the at least one pair of diametrically opposing holes may allow passage of the mass through the tube.

8 Claims, 11 Drawing Sheets

(56) References Cited

U.S. PATENT DOCUMENTS

| | | | |
|---|---|---|---|
| 2012/0006125 A1* | 1/2012 | Wen | G01M 7/08 |
| | | | 73/788 |
| 2016/0375296 A1* | 12/2016 | Downey | A63C 19/04 |
| | | | 52/506.01 |

FOREIGN PATENT DOCUMENTS

| | | | | | |
|---|---|---|---|---|---|
| CN | 206095565 | U | * | 4/2017 | |
| CN | 206192771 | U | * | 5/2017 | |
| CN | 107356324 | A | * | 11/2017 | ............ G01H 17/00 |
| CN | 109085243 | A | * | 12/2018 | ........... G01N 29/045 |
| CN | 111060597 | A | * | 4/2020 | ........... G01N 29/223 |
| JP | H0996598 | A | * | 4/1997 | |
| JP | 2001074594 | A | * | 3/2001 | |
| JP | 4062385 | B2 | * | 3/2008 | |
| JP | H11142309 | A | * | 3/2008 | |
| JP | 2008224632 | A | * | 9/2008 | ............ G01N 3/303 |
| KR | 20050082056 | A | * | 8/2005 | |
| KR | 101773703 | B1 | * | 8/2017 | ............ G01N 3/303 |
| KR | 101979112 | B1 | * | 5/2019 | ............ E04F 15/20 |
| KR | 100931891 | B1 | * | 12/2019 | ............ G01H 17/00 |
| KR | 102143488 | B1 | * | 8/2020 | |
| KR | 102245047 | B1 | * | 4/2021 | ............ E04F 15/20 |

OTHER PUBLICATIONS

Zhang, Thesis Measuring Acoustic Attenuation of Polymer Materials Using Drop Ball Test, Embry Riddle Aeronautical University, 2013 (Year: 2013).*

HGC Engineering, Ear to the Ground What is STC and IIC Testing? Oct. 2021 (Year: 2021).*

Aplicaciones Mecánicas del Caucho, Acoustic Isolator Pro: The App to Measure and Isolate Noise From Industrial Machinery, Mar. 17, 2021 (Year: 2021).*

* cited by examiner

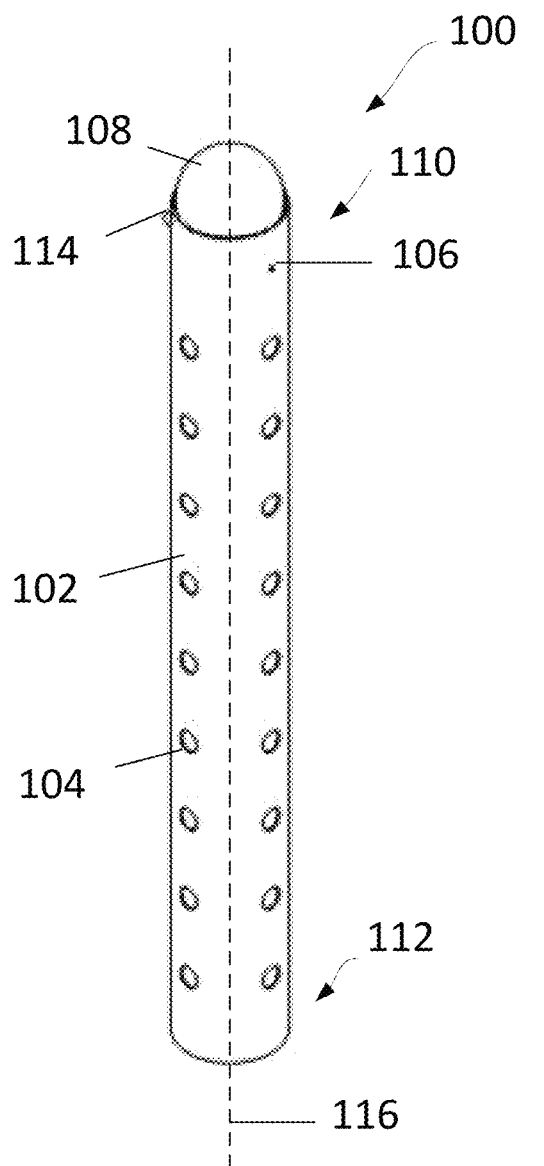
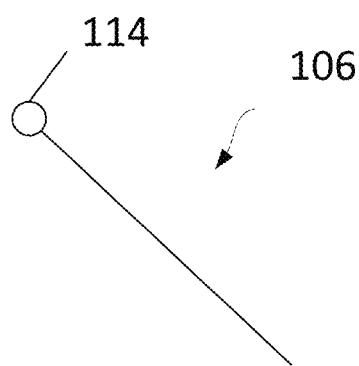
FIG. 1B
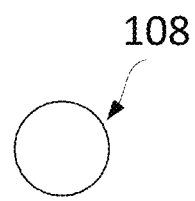
FIG. 1A
FIG. 1C

ACOUSTIC MEASUREMENT APPARATUS, KIT, AND METHOD OF USE THEREOF

TECHNICAL FIELD

The present application relates to acoustic insulation testing, and, more particularly, to methods and apparatuses for performing acoustic insulation testing and for providing recommendations based on the testing.

BACKGROUND

Noise continues to be a health hazard in many workplaces, homes, and meeting areas. Surfaces such as the windows, doors, and walls of a building need to diminish the transfer of unwanted sound into nearby areas. Acoustical testing helps determine levels of sound transmission through these surfaces.

One method for performing sound insulation testing involves providing acoustic measurement instrumentation to a surface and subsequently dropping an object from a certain height onto that surface. One of the challenges of this method of testing is reproducibility, as the height from which the object is dropped may not be consistent between tests. Another challenge of this method of testing is the portability of all testing components.

When performed by a layperson, there exists a further challenge of interpreting the test results in order to select appropriate acoustic insulation apparatuses based on the test results. Improvements to the field are desired.

DESCRIPTION OF THE DRAWINGS

Embodiments are described in detail below, with reference to the following drawings:

FIG. 1A a front view of an example apparatus, in accordance with an embodiment of the present application;

FIG. 1B is a is a front view of the elongated pin shown in FIG. 1A;

FIG. 1C is a front view of the mass shown in FIG. 1A;

Like reference numerals are used in the drawings to denote like elements and features.

DETAILED DESCRIPTION OF VARIOUS EMBODIMENTS

Figure 2A:
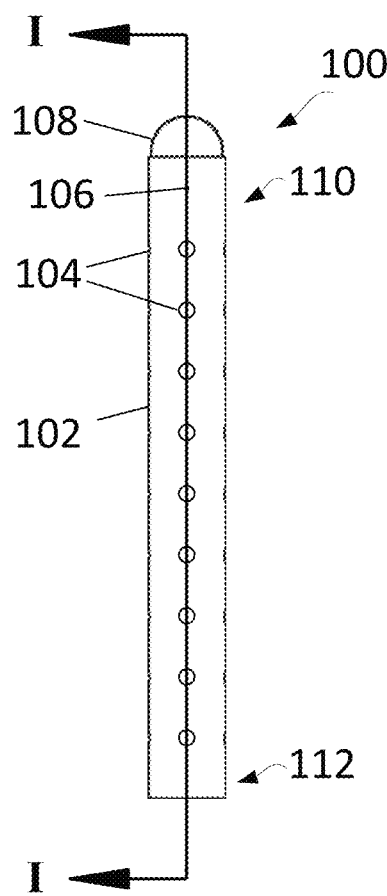
FIG. 2A is a side view of the example apparatus 100 shown in FIG. 1A.

In accordance with one embodiment of the present application, there may be provided a kit for measuring acoustic properties of a surface. The kit may comprise an elongated pin; a tube having first and second ends, the tube having at least one pair of diametrically opposing holes, the at least one pair of diametrically opposing holes operable to support the elongated pin therethrough; and a mass adapted to be received through the first and second ends of the tube. Placement of the elongated pin through a first pair of the at least one pair of diametrically opposing holes may prevent movement of the mass through the tube, and removal of the elongated pin through the first pair of the at least one pair of diametrically opposing holes allows passage of the mass through the tube.

In one aspect, the kit may further comprise a mat for placement on the surface beneath the tube for receiving the mass.

In another aspect, the mat may be made of an elastomer and may have a generally planar upper facing.

In yet another aspect, removal of the elongated pin through the first pair of the at least one pair of diametrically opposing holes may allow passage of the mass through the tube and onto the mat.

In still yet another aspect, the mass may be a sphere.

In still yet another aspect, a diameter of an interior of the tube may be larger than a width of the mass. In this way, a gap may be provided between the interior of the tube and the mass when the mass passes through the tube.

In still yet another aspect, the gap may have a width of at least 6 millimeters.

In still yet another aspect, the tube may have more than one pair of diametrically opposing holes to allow the elongated pin to be placed at different heights.

In still yet another aspect, the mass may be constructed of a non-deformable material.

In still yet another aspect, the mass may be constructed of steel.

In still yet another aspect, the kit may have a weight that does not exceed 30 kilograms.

In accordance with one embodiment of the present application, there may be provided a method for measuring acoustic properties of a surface. The method may comprise the steps of: a) providing acoustic measurement instrumentation beneath the surface; b) placing a mat upon the surface; c) positioning a tube upon the mat, a length of the tube being perpendicular to the surface, the tube having at least one pair of diametrically opposing holes; d) positioning an elongated pin through a first pair of the at least one pair of diametrically opposing holes; e) positioning a mass within the tube such that the mass rests upon the elongated pin; f) removing the elongated pin from the tube such that the mass falls through a bottom portion of the tube onto the surface thereby providing input to the acoustic measurement instrumentation; and g) obtaining a first resulting output by the acoustic measurement instrumentation.

In one aspect, the method may further comprise the steps of: repeating steps c) through f); obtaining a second resulting output by the acoustic measurement instrumentation; and determining an average resulting output by averaging the first resulting output and the second resulting output.

In another aspect, the method may further comprise: repeating steps c) through f); obtaining a second resulting output by the acoustic measurement instrumentation; repeating steps c) through f); obtaining a third resulting output by the acoustic measurement instrumentation; and determining an average resulting output by averaging the first resulting output, the second resulting output and the third resulting output.

In yet another aspect, the surface may be a slab floor.

In still yet another aspect, the mat may be formed of an elastomer and may have a generally planar upper facing.

In still yet another aspect, the tube may have more than one pair of diametrically opposing holes which may allow the elongated pin to be placed at different heights.

In still yet another aspect, the mass may be a sphere.

In still yet another aspect, the tube, the elongated pin, the mass, and the mat may have a combined weight that does not exceed 30 kilograms.

In accordance with one embodiment of the present application, there is provided a tube for measuring acoustic properties of a surface. The tube may comprise first and second ends and at least one pair of diametrically opposing holes. The at least one pair of diametrically opposing holes may be operable to support an elongated pin therethrough. Placement of the elongated pin through a first pair of the at least one pair of diametrically opposing holes may prevent movement of a mass through the tube. Removal of the elongated pin through the first pair of the at least one pair of diametrically opposing holes may allow passage of the mass through the tube.

In another aspect, a diameter of an interior of the tube may be larger than a width of the mass which may provide a gap between the interior of the tube and the mass when the mass passes through the tube.

In yet another aspect, the tube may have more than one pair of diametrically opposing holes which may allow the elongated pin to be placed at different heights.

In still yet another aspect, the tube may have a weight that does not exceed 5 kilograms.

In still yet another aspect, a diameter of the interior of the tube may not exceed 15 centimeters.

In still yet another aspect, a length of the tube may not exceed 120 centimeters.

In still yet another aspect, the mass may be a sphere.

In accordance with one embodiment of the present application, there may be provided a non-transitory computer readable medium comprising processor-executable instructions which, when executed, may configure a processor to: receive at least one output from acoustic measurement instrumentation, the at least one output representing an effect of a mass being dropped through a tube onto a floor after pulling a pin; calculate an average output of the at least one output; analyze the average output, including comparing the output to one or more sets of specifications, each of the one or more sets of specifications corresponding to one or more particular acoustic insulation apparatuses; identify a first grouping of the one or more sets of specifications, each of the one or more sets of specifications within the first grouping corresponding to the average output; generate a user interface including a listing of the one or more particular acoustic insulation apparatuses associated with the one or more sets of specifications of the first grouping; and present the user interface, the user interface including a listing of the one or more particular acoustic insulation apparatuses associated with the one or more sets of specifications of the first grouping.

In one aspect, the floor may comprise a base layer and a mat upon the base layer.

In another aspect, the base layer may be a slab.

In yet another aspect, the tube may have at least one pair of diametrically opposing holes operable to support an elongated pin therethrough.

In still yet another aspect, the tube may have first and second ends; the mass may be adapted to be received through the first and second ends of the tube; the placement of the elongated pin through a first pair of the at least one pair of diametrically opposing holes may prevent movement of the mass through the tube; and removal of the elongated pin through the first pair of the at least one pair of diametrically opposing holes may allow passage of the mass through the tube and onto the floor.

In still yet another aspect, a diameter of an interior of the tube may be larger than a width of the mass providing a gap between the interior of the tube and the mass when the mass passes through the tube.

In still yet another aspect, the tube may have more than one pair of diametrically opposing holes to allow the elongated pin to be placed at different heights.

In accordance with one embodiment of the present application, there may be provided a computer system comprising: a processor; a communications module coupled to the processor; an input module coupled to the processor; an output module coupled to the processor; and a memory coupled to the processor and storing instructions that, when executed by the processor, may cause the computer system to: receive, using the communications module, from acoustic measurement instrumentation via a computer network, at least one output from the acoustic measurement instrumentation, the at least one output representing an effect of a mass being dropped through a tube onto a floor after pulling a pin; calculate an average output of the at least one outputs; analyze the average output, including comparing the average output to one or more sets of specifications, each of the one or more sets of specifications corresponding to one or more particular acoustic insulation apparatuses; identify a first grouping of the one or more sets of specifications, each of the one or more sets of specifications with the first grouping corresponding to the average output; generate a user interface including a listing of the one or more particular acoustic insulation apparatuses associated with the one or more sets of specifications of the first grouping; and present, using the output module, the user interface including a listing of the one or more particular acoustic insulation apparatuses associated with the one or more sets of specifications of the first grouping.

In one aspect, the floor may comprise a base layer and a mat upon the base layer.

In another aspect, the base layer may be a slab.

In yet another aspect, the tube may have at least one pair of diametrically opposing holes operable to support an elongated pin therethrough.

In still yet another aspect, the tube may have first and second ends; the mass may be adapted to be received through the first and second ends of the tube; the placement of the elongated pin through a first pair of the at least one pair of diametrically opposing holes may prevent movement of the mass through the tube; and removal of the elongated pin through the first pair of the at least one pair of diametrically opposing holes may allow passage of the mass through the tube and onto the floor.

In still yet another aspect, a diameter of an interior of the tube may be larger than a width of the mass providing a gap between the interior of the tube and the mass when the mass passes through the tube.

In still yet another aspect, the tube may have more than one pair of diametrically opposing holes to allow the elongated pin to be placed at different heights.

In accordance with one embodiment of the present application, there may be provided a computer-implemented method for identifying one or more acoustic insulators, the computer-implemented method comprising: providing acoustic measurement instrumentation beneath a floor; positioning a tube upon the floor, a length of the tube being perpendicular to the floor, the tube having at least one pair of diametrically opposing holes; positioning an elongated pin through a first pair of the at least one pair of diametrically opposing holes; positioning a mass within the tube such that the mass rests upon the elongated pin; removing the elongated pin from the tube such that the mass falls through a bottom portion of the tube onto the floor thereby providing input to the acoustic measurement instrumentation; uploading, to a computer system, a resulting output by the acoustic measurement instrumentation; and receiving, from the computer system, a listing including at least one acoustic insulation apparatuses.

In one aspect, the floor may comprise a base layer and a mat upon the base layer.

In another aspect, the base layer may be a slab.

In yet another aspect, the tube may have at least one pair of diametrically opposing holes operable to support an elongated pin therethrough.

In still yet another aspect, the tube may have first and second ends; the mass may be adapted to be received through the first and second ends of the tube; placement of the elongated pin through a first pair of the at least one pair of diametrically opposing holes may prevent movement of the mass through the tube; and removal of the elongated pin through the first pair of the at least one pair of diametrically opposing holes may allow passage of the mass through the tube and onto the floor.

In still yet another aspect, the tube may have more than one pair of diametrically opposing holes to allow the elongated pin to be placed at different heights.

Reference will first be made to FIG. 1A, which is a front view of an example apparatus 100. The example apparatus 100 includes a tube 102, an elongated pin 106 and a mass 108. The tube 102 may be cylindrical and may have an axis 116. The tube may have first and second open ends 110 and 112, respectively. The tube may be configured to be supported by a generally planar substructure. For example, the tube 102 may be configured such that, when placed on the ground, the tube 102 is stable and provides a cylinder that rises at a 90-degree angle with respect to the ground. The tube 102 may be portable and may thus have properties that contribute to the portability of the tube 102. For example, the tube 102 may have a weight that does not exceed 5 kilograms. Additionally or alternatively, the tube 102 may have an interior diameter that does not exceed 15 centimetres. Additionally or alternatively, the tube 102 may have a length that does not exceed 120 centimeters.

As shown in FIG. 1A, the tube 102 may have one or more holes 104. The tube 102 may have at least one pair of holes 104, and the at least one pair of holes 104 may be at least one pair of diametrically opposing holes. In this context, the expression "diametrically opposing holes" refers to a pair of holes 104 being positioned opposite one another along a diameter of the tube 102. In this way, each of the at least one pair of diametrically opposing holes 104 may be operable to support an elongated pin 106 therethrough, such that the elongated pin 106 may be supported perpendicular to the axis 116 of the tube. The elongated pin 106 may have a handle 114, which may provide a user of the apparatus 100 with ease of use. The apparatus 100 may be arranged such that a mass 108 may be placed upon the elongated pin 106 through the first open end 110 of the tube 102. The example apparatus 100 may be arranged such that upon removal of the elongated pin 106 from the tube 102, the mass 108 may travel through the tube 102 and exit the tube 102 through the second open end 112 of the tube 102.

In some embodiments, the tube 102 may be composed of a non-deformable material. For example, the tube may be composed of polyvinyl chloride (PVC) or acrylonitrile butadiene styrene (ABS) or the like. In some embodiments, the tube may have a length measuring between 60 cm and 120 cm and may have an interior diameter measuring between 10 cm and 15 cm. In some embodiments, the tube 102 may have a weight that does not exceed 5 kg. In some embodiments, the tube 102 may have multiple pairs of diametrically opposing holes 104 which may allow the elongated pin 106 to be placed at different heights and/or to provide ease of use of the apparatus 100. In some embodiments, the tube 102 may have no diametrically opposing holes 104. In such embodiments, the mass 108 may be released directly into the first open end 110 of the tube 102. In such embodiments, the elongated pin 106 may not form part of the apparatus 100.

The apparatus 100 may be portable. For example, the apparatus 100 may have properties that allow the apparatus 100 to be carried in a backpack by a user. Additionally or alternatively, the apparatus 100 may have a total weight that does not exceed 25 kilograms.

FIG. 1B is a front view of the elongated pin 106. The elongated pin 106 may include a handle 114. The handle 114 may provide a user of the apparatus 100 with ease of use. The handle 114 may be a loop, or the handle 114 may be of another type, such as an L-shaped pull.

FIG. 1C is a front view of the mass 108. The mass may be one or more of a weight, shot, pellet, ball, bullet, cartridge, slug etc. The mass 108 may be adapted to be received through the first and second open ends 110, 112 of the tube 102. In other words, the mass 108 may have dimensions such that the mass 108 may enter the tube 102 through the first open end 110, travel through the tube 102, and exit the tube 102 through the second open end 112. When the elongated pin 106 is placed through the tube 102, the mass 108 may be adapted so that it may rest upon the elongated pin 106.

The mass 108 may be constructed of a non-deformable material; for example, the mass 108 may be constructed of steel, iron, composite material, or the like. The mass 108 may be portable and may thus have dimensions that contribute to the portability of the mass 108. For example, the mass 108 may have a weight between 4 kg and 20 kg. Additionally or alternatively, the mass 108 may have a diameter between 8 cm and 23 cm.

The mass 108 may be a sphere, as shown in FIG. 1A and FIG. 1C. The mass may be, for example, a bowling ball. However, the mass 108 may take a variety of forms. For example, the mass 108 may be, or may have a shape similar to, a prism or a pyramid. The mass 108 may be, or may have a shape similar to, a cylinder or a cone. The mass 108 may also be of an irregular shape. For example, the mass 108 may be a common rock, or be of a form similar to a common rock, in some instances.

The diameter of the interior of the tube 102 may be larger than a width of the mass 108 providing a gap between the interior of the tube 102 and the mass 108 when the mass 108 passes through the tube 102. The presence of the gap may provide for the uninterrupted travel of the mass 108 through the tube 102. The gap may be of various widths. The gap may have a width of at least six millimeters.

Figure 2B:
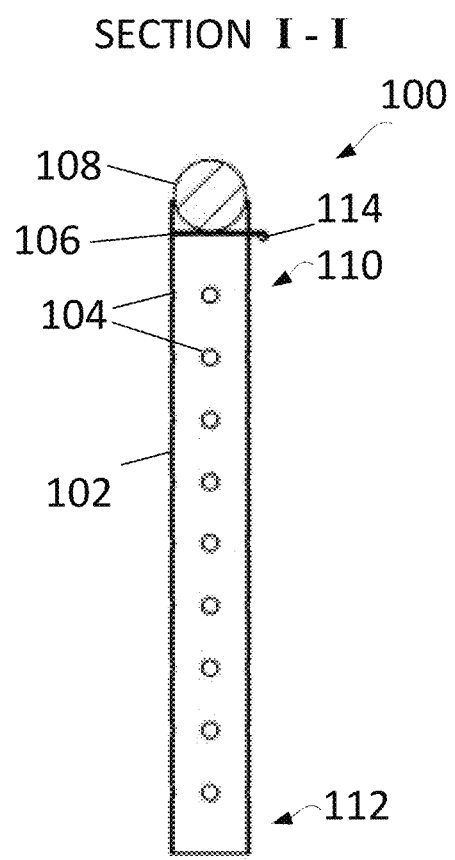
FIG. 2B is a section view of FIG. 2A along cross-section I-I of FIG. 2A.

Reference is now made to FIG. 2A and FIG. 2B. FIG. 2A is a side view of the example apparatus 100 shown in FIG. 1A. FIG. 2B is a section view of FIG. 2A along cross-section I-I of FIG. 2A.

FIG. 2A illustrates an example apparatus 100 including an elongated pin 106, a mass 108, a tube 102 having first and second open ends 110, 112, and one or more holes 104. In the illustrated example, the tube 102 includes a first set of multiple pairs of diametrically opposing holes 104 that are opposed about a first diameter of the tube 102. In the illustrated example, the tube 102 also includes a second set of multiple pairs of diametrically opposing holes 104 that are opposed about a second diameter of the tube 102, the second diameter of the tube 102 being perpendicular to the first diameter of the tube 102. The two sets of multiple pairs of diametrically opposing holes 104 may allow the elongated pin 106 to be placed at different heights and/or may provide ease of use of the example apparatus 100. As shown, cutting plane I-I passes through the centre of apparatus 100.

FIG. 2B is a sectional view of the example apparatus 100 along cutting plane I-I shown in FIG. 2A. Similar to FIG. 2A, FIG. 2B illustrates an elongated pin 106, a mass 108, a tube 102 having first and second open ends 110, 112, and one or more holes 104. In this example, the mass 108 is shown as being solid, as indicated by the oblique lines through the mass 108, as shown. Alternatively, the mass 108 may be hollow or may contain one or more holes. FIG. 2B clearly illustrates an embodiment including the elongated pin 106 supporting the mass 108. The handle 114 is shown extending through the tube 102. The handle 114 may provide ease of use to a user during removal of the elongated pin 106 through the tube 102. FIGS. 2A and 2B illustrate an embodiment of the example apparatus 100 having a first set of multiple pairs of diametrically opposing holes 104 that are opposed about a first diameter of the tube 102. FIGS. 2A and 2B illustrate an embodiment of the example apparatus 100 also having a second set of multiple pairs of diametrically opposing holes 104 that are opposed about a second diameter of the tube 102. In these illustrations, the first and second diameters of the tube 102 are perpendicular to one another. This arrangement may provide ease of use to a user when placing the elongated pin 106 through a pair of diametrically opposing holes 104 and may allow the user to place the elongated pin at different heights.

Figure 3:
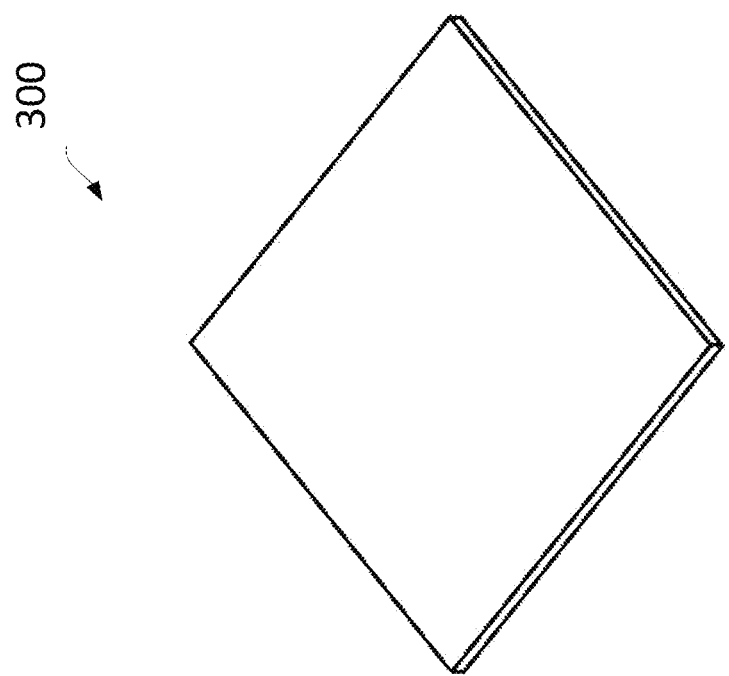
FIG. 3 illustrates an example mat, in accordance with an embodiment of the present application.

FIG. 3 shows an example mat 300 in accordance with one aspect of the present application. The example mat 300 may be a shock-absorbing mat, and may have a rectangular shape, a consistent thickness, and uneven edges. The example mat 300 may be formed of rubber. The example mat 300 may have a generally planar upper facing. The example mat 300 may be a commercially available mat, such as the GenieMat FITO8™. Various embodiments of the present application may include a mat 300 that may take a variety of forms. For example, the mat 300 may have a circular shape, an oval shape, a triangular shape, or an irregular shape. The mat 300 may have edges that are even and/or the mat 300 may have edges that are uneven. The mat 300 may have a consistent thickness, or the mat 300 may have an inconsistent thickness. The mat may have, for example, a thickness of between 5 mm and 10 mm. The mat 300 may have shock-absorbing properties. The mat 300 may be formed of a polymer, such as an elastomer. The mat 300 may be portable and may have properties that contribute to the portability of the mat 300. For example, the mat 300 may have a weight that does not exceed 5 kilograms. The mat 300 may have a surface area that does not exceed 1 square meter.

Figure 4:
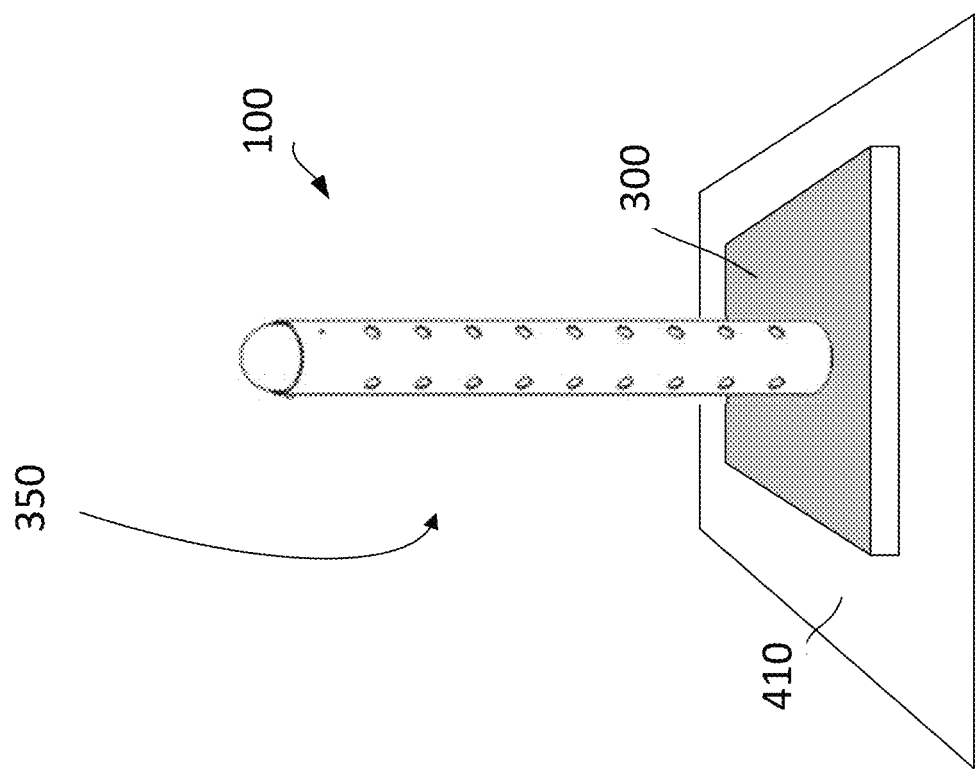
FIG. 4 illustrates an example kit upon a surface, in accordance with an embodiment of the present application.

FIG. 4 illustrates an example kit 350 in accordance with one embodiment of the present application. The example kit 350 may comprise the example apparatus 100 of FIG. 1A-FIG. 2B together with the example mat 300 of FIG. 3. FIG. 4 illustrates the example apparatus 100 positioned upon the example mat 300. In this embodiment, the example mat 300 is placed directly on a surface 410. The surface 410 may be, for example, a slab. In some embodiments, the example apparatus 100 may be held by a user. Alternatively, the example apparatus 100 may be freestanding, i.e., the apparatus 100 may be placed in such a way that the tube 102 remains perpendicular to the surface 410 without additional structural support.

Consistent with previous description, the components of the kit 350 may have properties that contribute to their respective portability. Additionally, the components of the kit 350 may have properties that contribute to their cumulative portability. In other words, the components may have properties that contribute to the overall portability of the kit 350. For example, the kit 350 may have a total weight that does not exceed 30 kilograms. In other words, the tube, the elongated pin, the mass, and the mat may have a combined weight that does not exceed 30 kilograms.

The components of the kit 350 may have other properties, for example, dimensions, such that the kit 350 may be easily carried by a user from one destination to another. For example, the components of the kit 350 may fit into a backpack.

Figure 5:
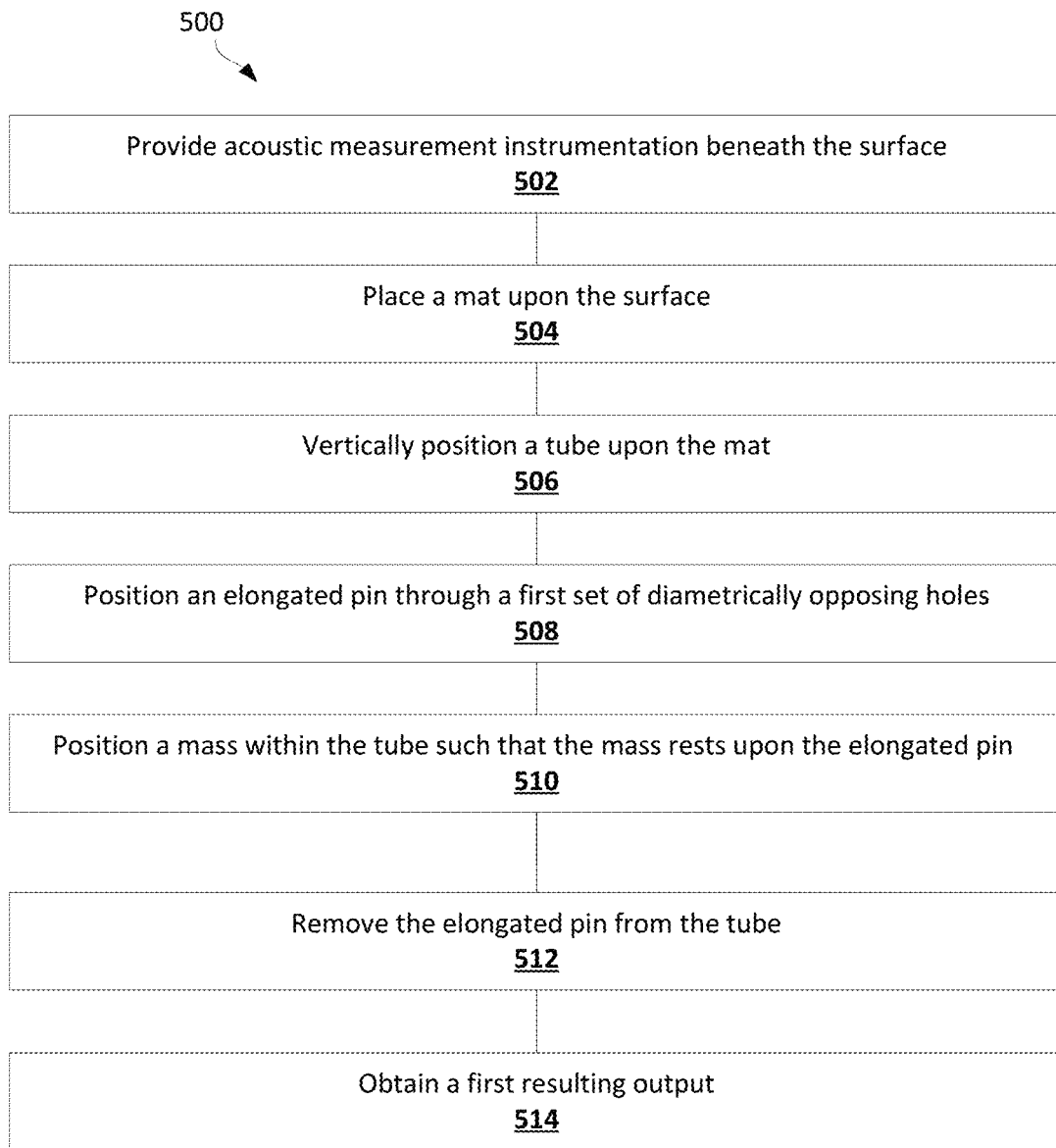
FIG. 5 is a flowchart of a method of measuring acoustic properties of a surface, in accordance with an embodiment of the present application.
Figure 6:
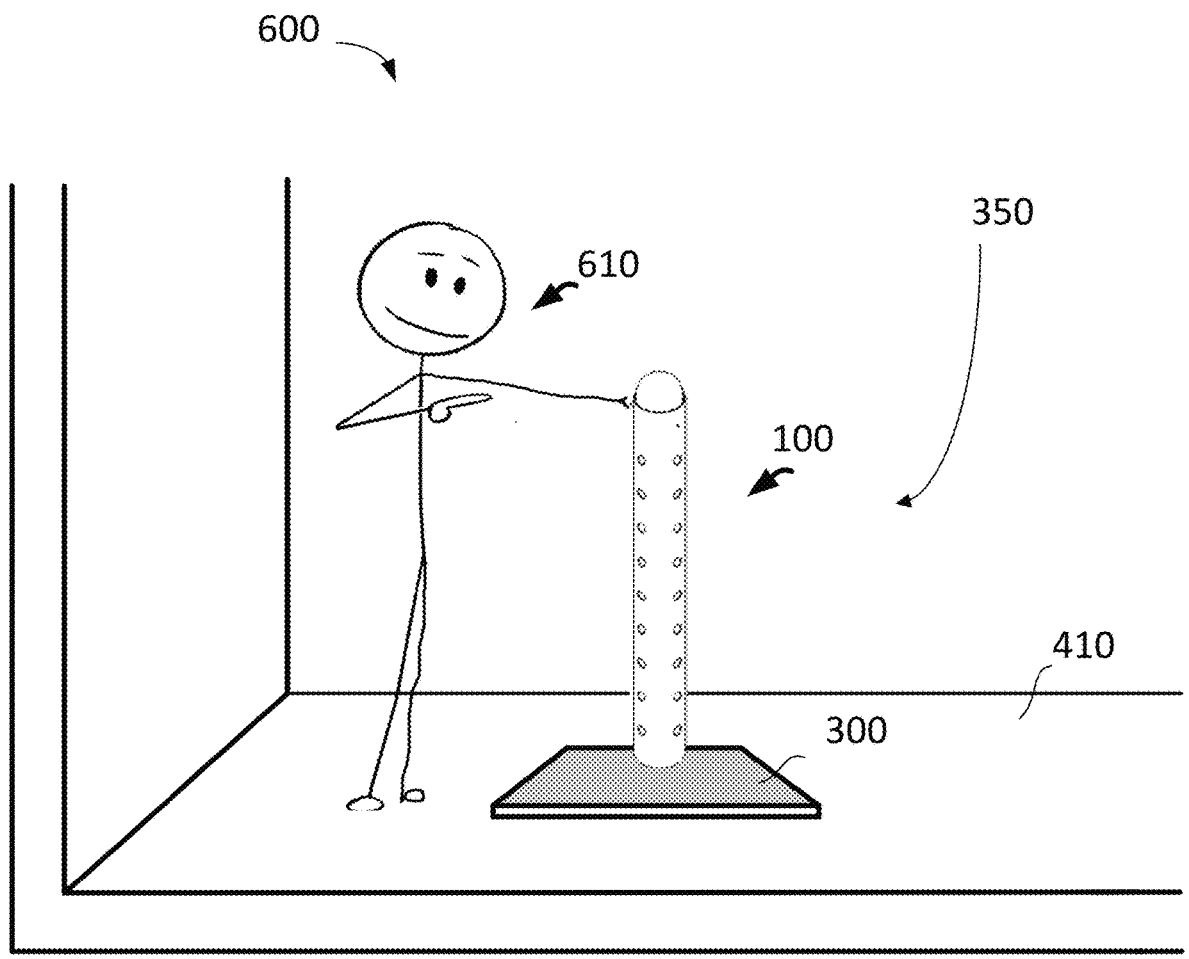
FIG. 6 illustrates an example embodiment of a user performing an example method, in accordance with an embodiment of the present application.
Figure 6:
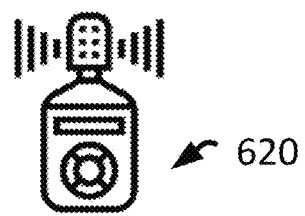

Reference will now be made to FIG. 5 which illustrates in flowchart form a method 500 of measuring acoustic properties of a surface. Examples of the method 500 will be discussed with reference to the example embodiment 600 of FIG. 6, which illustrates a user 610 performing an example method of the present application. Example embodiment 600 shows the user 610; the kit 350, including the apparatus 100 and the mat 300; the surface 410 and the acoustic measurement instrumentation 620.

The method 500 may include, at step 502, providing acoustic measurement instrumentation 620 beneath the surface 410. As illustrated by the example embodiment 600, the surface 410 may be a slab. The acoustic measurement instrumentation 620 may be placed beneath the surface 410. The acoustic measurement instrumentation 620 may be, for example, a sound level meter, sometimes referred to as a sound pressure level (SPL) meter, decibel (dB) meter, noise meter or noise dosimeter, Additionally or alternatively, a vibration meter may be placed beneath the surface 410. In some embodiments, the acoustic measurement instrumentation 620 may be temporarily or permanently installed beneath the surface 410. In some embodiments, the acoustic instrumentation may be hand-held and may be provided by one or more auxiliary users of the method 500.

Figure 7:
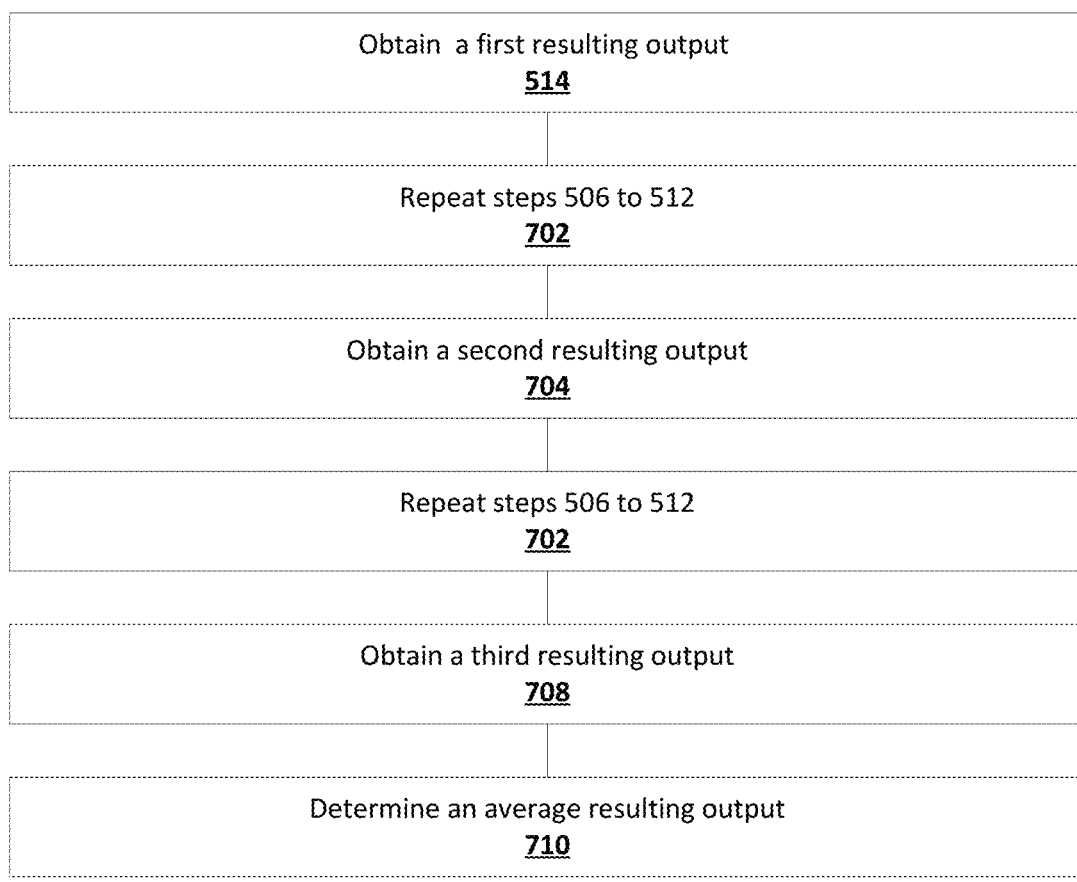
FIG. 7 is a flowchart of a method of determining an average resulting output, in accordance with an embodiment of the present application.

At step 504, a mat 300 may be placed upon the surface 410. The mat 300 may be a shock-absorbing mat. In some embodiments, prior to placing the mat 300, any existing flooring may be removed from the surface 410 so that the mat 300 may be placed directly upon the surface 410, which may be, for example, a slab, as will be further described with reference to FIG. 7.

At step 506 a tube 102 is vertically positioned upon the mat 300. In other words, the tube 102 may be positioned such that a length of the tube is perpendicular to the surface. In some preferred embodiments, the tube 102 is vertically positioned in the centre of the mat 300. The tube 102 may be placed such that it is freestanding, i.e., the tube 102 may be placed in such a way that the length of the tube remains perpendicular to the surface 410 without additional structural support. Alternatively, the tube 102 may be supported in a vertical position, for example, by supporting means such as the hand of the user 610. Notably, the example embodiment 600 illustrates a particular example where the tube 102 is freestanding and the user 610 has engaged the handle 114 of the elongated pin 106 by hand in preparation for releasing the elongated pin 106 from the tube 102.

At step 508, the user 610 may position an elongated pin 106 through a first pair of diametrically opposing holes 104. In embodiments where the tube 102 has multiple pairs of diametrically opposing holes 104 provided at varying heights, the user 610 may select the pair of diametrically opposing holes 104 corresponding to a desired height. As previously described, in some embodiments, the tube 102 may not have any pairs of diametrically opposing holes 104, and/or the user 610 of the apparatus 100 may wish to avoid the use of the elongated pin 106. In some such embodiments, step 508 may be omitted.

At step 510, a mass 108 may be positioned within the tube 102 such that the mass 108 rests upon the elongated pin 106. In some embodiments, after positioning the mass 108, depending on the position of the elongated pin 106, some or all of the mass 108 may extend beyond the first open end 110 of the tube 102, as shown in the examples of FIGS. 1A, 2A, 2B, 4 and 7. As previously described, in some embodiments, the tube 102 may not have any pairs of diametrically opposing holes 104 and/or the user 610 may wish to avoid the use of the elongated pin 106. In some such embodiments, instead of positioning the mass 108 such that it rests upon the elongated pin 106, the mass 108 may be suspended at or near the first open end 110 of the tube 102. For example, the mass 108 may be held by hand at or near the first open end 110 of the tube 102.

At step 512, the elongated pin 106 may be removed from the tube 102 such that the mass 108 falls through a bottom portion of the tube 102 onto the surface 410. In other words, the elongated pin 106 may be removed from the tube 102 such that the mass 108 falls through the second open end 112 of the tube 102 onto the surface 410. In this way, the mass 108 may apply a first force to the mat 300. As a result, a second force may be transferred by the mat 300 to the surface 410 beneath the mat 300. In turn, a third force may be transferred by the surface 410 to the environment below the surface 410. The magnitude of the third force may depend, in one aspect, upon the acoustic properties of the surface 410. The third force, and/or an effect thereof, may subsequently be measured by the acoustic measurement instrumentation 620 that may have been provided beneath the surface 410 at step 502.

At step 514, a first resulting output may be obtained. The first resulting output may be provided by the acoustic measurement instrumentation 620. The first resulting output may be obtained by the user 610 or by an auxiliary user by reading the acoustic instrumentation. Additionally or alternatively, the first resulting output may be obtained electronically by one or more computing devices.

In some instances, an averaged measurement may be preferred. As a result, in some embodiments, more than one output may be obtained for the same surface 410 using the same apparatus 100, mat 300 and desired height. To this end, reference is made to FIG. 7, which illustrates in flowchart form a method 700 of determining an average resulting output. The method 700 may include, at step 514, obtaining a first resulting output. A first resulting output may be obtained as previously outlined in the steps of the method 500 of FIG. 5.

Next, at step 702, steps 506 to 512, inclusive, may be repeated. At step 704, a second resulting output may be obtained. As with the first resulting output, the second resulting output may be provided by the acoustic measurement instrumentation 620. The second resulting output may be obtained by the user 610, or by an auxiliary user, for example, by reading the acoustic instrumentation. Additionally or alternatively, the second resulting output may be obtained electronically by one or more computing devices.

At this stage of the method 700, step 702, (i.e., repeating steps 506 to 512), may be repeated. Thereafter, at step 708, a second resulting output may be obtained. As with the first resulting output, the third resulting output may be provided by the acoustic measurement instrumentation 620. The third resulting output may be obtained by the user 610, or by an auxiliary user, for example, by reading the acoustic instrumentation. Additionally or alternatively, the third resulting output may be obtained electronically by one or more computing devices.

At step 710, an average resulting output may be determined. The averaged resulting output may be determined by the user 610, or by an auxiliary user. The user 610, or an auxiliary user, may determine the average resulting output mentally, by using pen and paper, or by using a calculator. Additionally or alternatively, the average resulting output may be determined by a computing device. In some embodiments, when the first, second and third outputs are obtained by a computing device, the average resulting output may also be obtained by the computing device.

The method 700 may have several variations. For example, the method 700 may omit the second instance of step 702 and may omit step 708. In such instances, the average resulting output may be determined based on the first and second resulting outputs. Another example variation of the method 700 may include additional repetitions of step 702. In such variations, following each repetition of step 702, a subsequent resulting output may be obtained. As a result, in such variations, step 710 will include the averaging of a number of resulting outputs that is equal to the number of repetitions of step 702 that have been performed in that variation.

Figure 8:
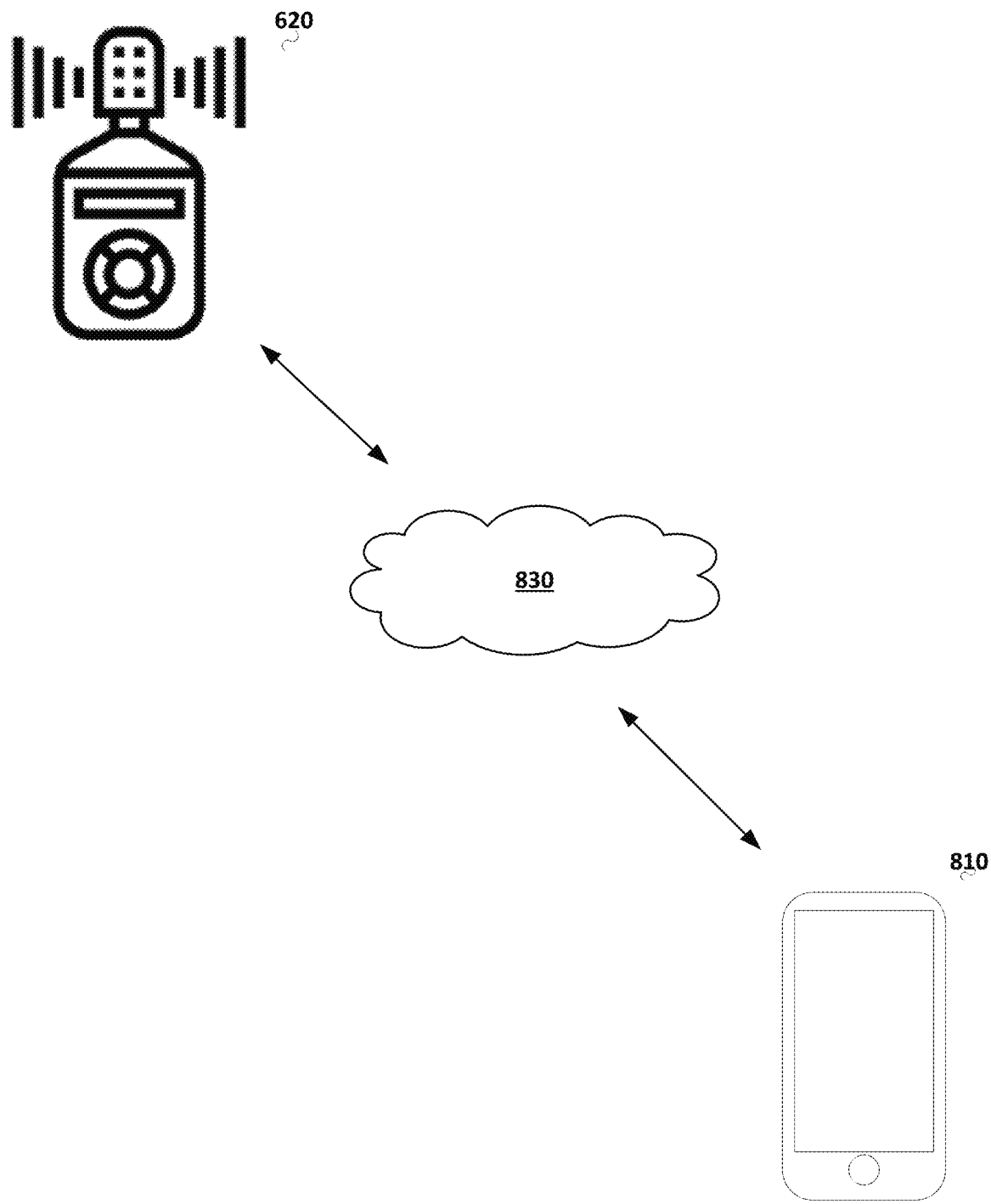
FIG. 8 is a schematic operation diagram illustrating an operating environment of an example embodiment of the present application.

FIG. 8 will now be discussed. FIG. 8 is a schematic operation diagram illustrating an operating environment of an example embodiment. As illustrated, acoustic measurement instrumentation 620 communicates with a first computing device 810 via a network 830. The network 830 may be a wireless network. The network 830 may utilize direct wireless communication, such as, for example, Bluetooth™. Additionally or alternatively, the network may include physical connections to the acoustic measurement instrumentation 620 and/or to the first computing device 810. The physical connections may be, for example, cable connections. The first computing device 810 is both a computer system and a computing device.

The acoustic measurement instrumentation 620 may measure ambient sound levels by calculating the pressure of the sound waves traveling through the air from a source of noise. The acoustic measurement instrumentation 620 may be a sound level meter, also known as a sound pressure level meter (SPL). The acoustic measurement instrumentation 620 may or may not be hand-held.

The acoustic measurement instrumentation 620 may include an acoustic measurement sensor such as a microphone and/or an accelerometer. The acoustic measurement instrumentation 620 may also include a signal conditioning system such as one or more of an analog-to-digital converter (ADC), and an anti-aliasing filter. The acoustic measurement instrumentation 620 may also include an acoustic analysis component.

The acoustic measurement instrumentation 620 may be designed to meet international standards such as International Electrotechnical Commission (IEC) 60651, IEC 60804 and American National Standards Institute (ANSI) S1.4. The acoustic measurement instrumentation 620 may be graded as type or class 0-3.

The acoustic measurement instrumentation 620 may also be a virtual software meter. For example, an auxiliary computing device may be adapted to operate as a virtual software meter. The auxiliary computing device may be, for example, a smartphone, a tablet, or a laptop, and may includes a variety of modules, such as those that will be described with reference to FIG. 10. The auxiliary computing device may be adapted to operate as a virtual software meter through the implementation of application software. Examples of application software which may adapt the auxiliary computing device in this way may include Sound Pressure Level (SPL) Meter™, Audacity™, Virtual Sound Level Meter™ and Darkwood Designs™ Audio Level Meters.

The acoustic measurement instrumentation 620 may provide output. For example, the acoustic measurement instrumentation 620 may provide output corresponding to ambient sound levels. For example, output corresponding to ambient sound levels may be provided in decibels (dB) or in weighted decibels, such as A-weighted decibels (dBA). Additionally or alternatively, the acoustic measurement instrumentation 620 may provide output corresponding to ambient vibration. For example, output corresponding to ambient vibration may be provided in metres per second squared (m/s$^2$)

The network 830 is a computer network. In some embodiments, the network 830 may be an internetwork such as may be formed of one or more interconnected computer networks. For example, the network 830 may be or may include an Ethernet network, an asynchronous transfer mode (ATM) network, a wireless network, or the like.

As further described below, the first computing device 810 may be adapted to present a user interface. The first computing device 810 may co-operate with the acoustic measurement instrumentation 620 to present the user interface including a listing of the one or more particular sound reduction apparatuses.

Figure 9:
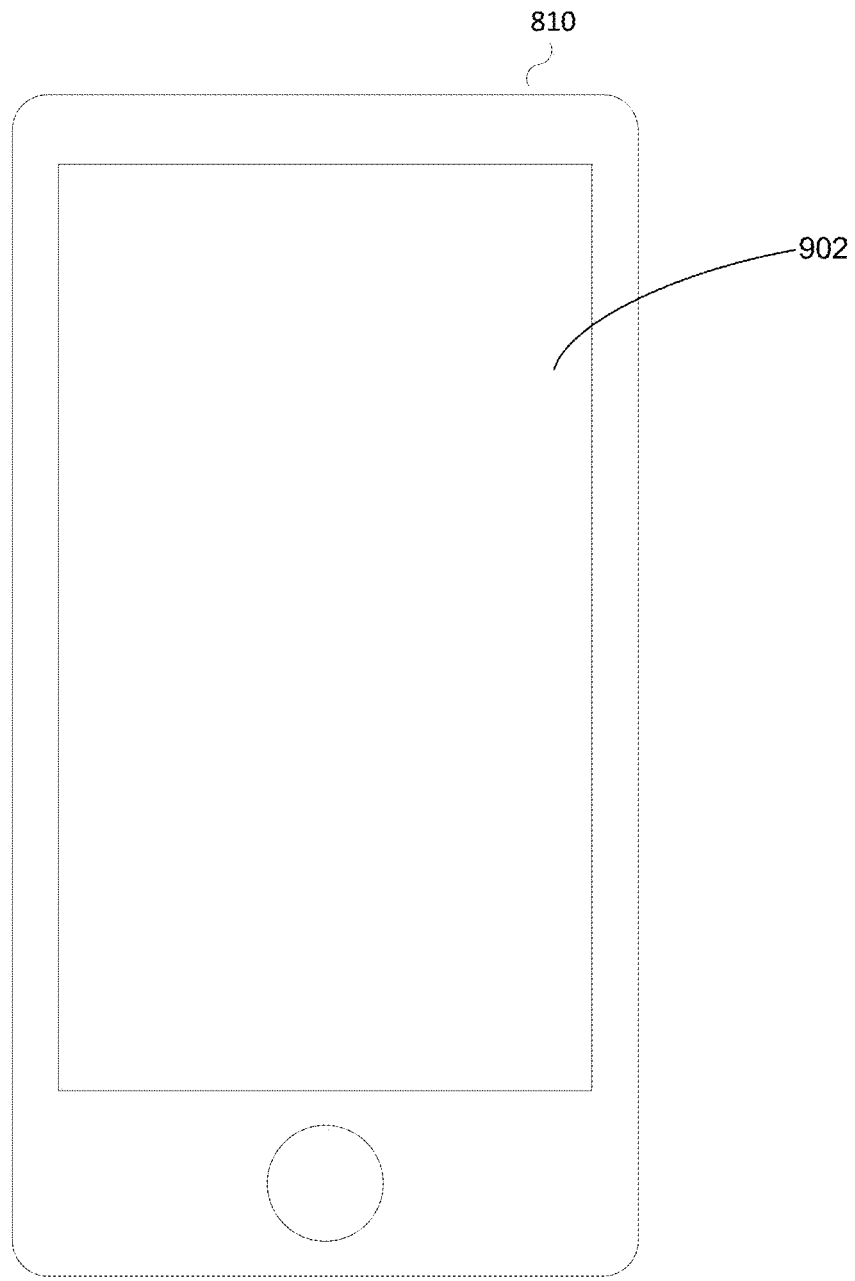
FIG. 9 shows the front of the first computing device of FIG. 8.

FIG. 9 shows the front of the first computing device 810. The first computing device 810 may be a computer system such as, for example, a laptop, a desktop, a mobile device, and/or a wearable. In some embodiments, the first computing device may be a smartphone as shown in FIG. 8. In other embodiments, the first computing device 810 may be another form of first computing device such as, for example, a tablet or a laptop.

As illustrated, the front of the first computing device 810 includes a display 902. The display 902 is a module of the first computing device 810. The display 902 is for presenting graphics. The display 902 may be, for example, a liquid crystal display (LCD). In addition to being an output device, the display 902 may also be an input device. For example, the display 902 may allow touch input to be provided to the first computing device 810. In other words, the display 902 may be a touch sensitive display module. In a particular example, the display 902 may be a capacitive touch screen.

Figure 10:
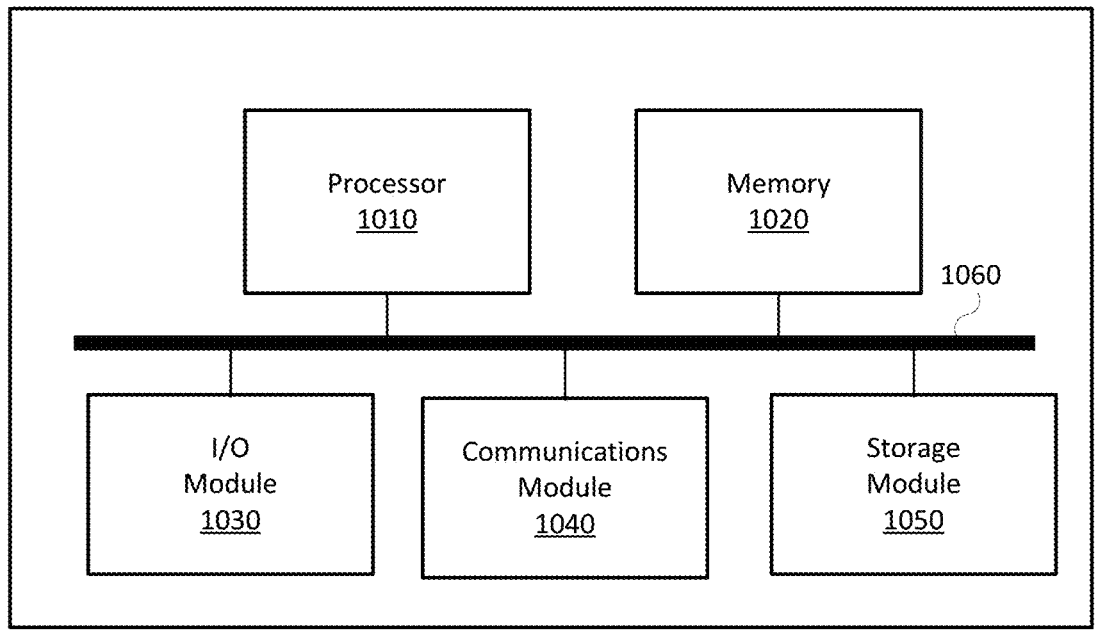
FIG. 10 is high-level schematic diagram of the first computing device of FIG. 9.

FIG. 10 is a high-level schematic diagram of the first computing device 810.

The first computing device 810 includes a variety of modules. For example, as illustrated, the first computing device 810 may include a processor 1010, a memory 1020, a communications module 1040, an I/O module 1030, and/or a storage module 1050. As illustrated, the foregoing example modules of the first computing device 810 are in communication over a bus 1060.

The processor 1010 is a hardware processor. The processor 1010 may, for example, be one or more ARM, Intel x86, PowerPC processors or the like.

The memory 1020 allows data to be stored and retrieved. The memory 1020 may include, for example, random access memory, read-only memory, and persistent storage. Persistent storage may be, for example, flash memory, a solid-state drive, or the like. Read-only memory and persistent storage are a non-transitory computer-readable storage medium. A computer-readable medium may be organized using a file system such as may be administered by an operating system governing overall operation of the first computing device 810.

The I/O module 1030 is an input module and an output module. As an input module, the I/O module 1030 allows the first computing device 810 to receive input from components of the first computing device 810. As an output module, the I/O module 1030 allows the first computing device 810 to provide output to components of the first computing device 810. For example, the I/O module 1030 may allow the first computing device 810 to provide output to and/or receive input from the display 902.

The communications module 1040 allows the first computing device 810 to communicate with other computing devices and/or various communications networks, such as, for example, the network 830. The communications module 1040 may allow the first computing device 810 to send or receive communications signals. Communications signals may be sent or received according to one or more protocols or according to one or more standards. For example, the communications module 1040 may allow the first computing device 810 to communicate via a cellular data network, such as, for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 1040 may allow the first computing device 810 to communicate using near-field communication (NFC), via Wi-Fi™, using Bluetooth™ or via some combination of one or more networks or protocols. In some embodiments, all or a portion of the communications module 1040 may be integrated into a component of the first computing device 810. For example, the communications module may be integrated into a communications chipset.

The storage module 1050 allows data to be stored and retrieved. In some embodiments, the storage module 1050 may be formed as a part of the memory 1020 and/or may be used to access all or a portion of the memory 1020. Additionally or alternatively, the storage module 1050 may be used to store and retrieve data from persisted storage other than the persisted storage (if any) accessible via the memory 1020. In some embodiments, the storage module 1050 may be used to store and retrieve data in/from a database. A database may be stored in persisted storage. Additionally or alternatively, the storage module 1050 may access data stored remotely such as, for example, as may be accessed using a local area network (LAN), wide area network (WAN), personal area network (PAN), and/or a storage area network (SAN). In some embodiments, the storage module 1050 may access data stored remotely using the communications module 1040. In some embodiments, the storage module 1050 may be omitted and its function may be performed by the memory 1020 and/or by the processor 1010 in concert with the communications module 1040 such as, for example, if data is stored remotely The storage module 1050 may store information relating to one or more sets of specifications for one or more particular acoustic insulation apparatuses. The one or more particular acoustic insulation apparatuses may include, for example, one or more types of flooring underlay, one or more types of vibration isolator, and one or more types of floor coverings. Additionally or alternatively, the one or more acoustic insulation apparatuses may be or include a ceiling treatment. The one or more specifications may describe various features and properties of the one or more acoustic insulation apparatuses, such as corresponding isolation efficiency data, noise reduction data, installation data, size and thickness data, static deflection data, Water, Petroleum, Alkali and Fuel Resistance data, density data, data corresponding to one or more ASTM standards, feature and benefit data, pricing data, etcetera.

Software comprising instructions is executed by the processor 1010 from a computer-readable medium. For example, software may be loaded into random-access memory from persistent storage of the memory 1020. Additionally or alternatively, instructions may be executed by the processor 1010 directly from read-only memory of the memory 1020.

Figure 11:
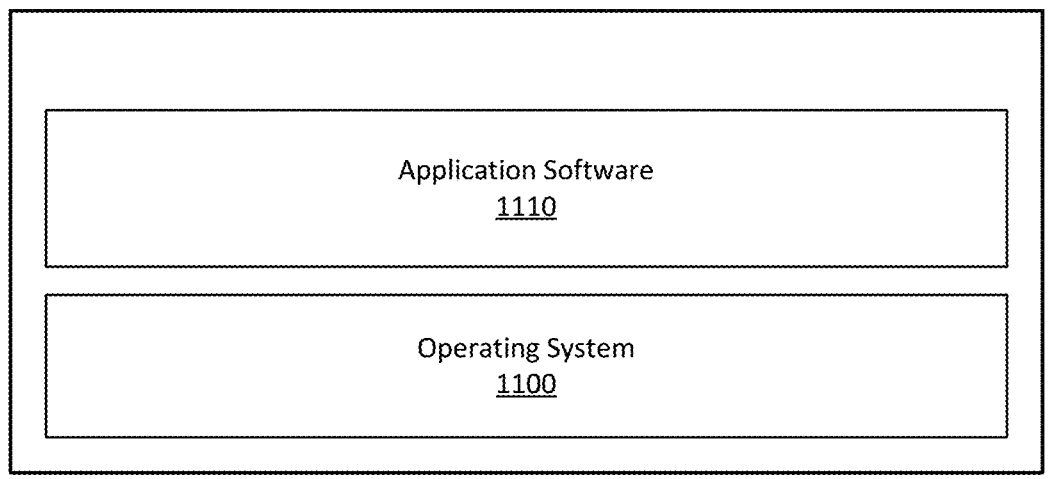
FIG. 11 shows a simplified organization of software components stored in a memory of the first computing device of FIG. 1.

FIG. 11 depicts a simplified organization of software components stored in the memory 1020 of the first computing device 810. As illustrated, these software components include an operating system 1100 and an application software 1110.

The operating system 1100 is software. The operating system 1100 allows the application software 1110 to access the processor 1010 (FIG. 10), the memory 1020, the communications module 1040, the I/O module 1030, and the storage module 1050 of the first computing device 810. The operating system 1100 may be, for example, Google™ Android™, Apple™ iOS™, UNIX™, Linux™, Microsoft™ Windows™, Apple OSX™ or the like.

The application software 1110 adapts the first computing device 810, in combination with the operating system 1100, to operate as a device for generating and presenting one or more a user interfaces including a listing of the one or more particular sound reduction apparatuses. Where the first computing device 810 is a smartphone or tablet, the application software 1110 may itself be or may be a part of a smartphone or tablet application or "app". In a particular example, the application software 1110 may correspond to a sound reduction apparatus recommendation app.

Figure 12:
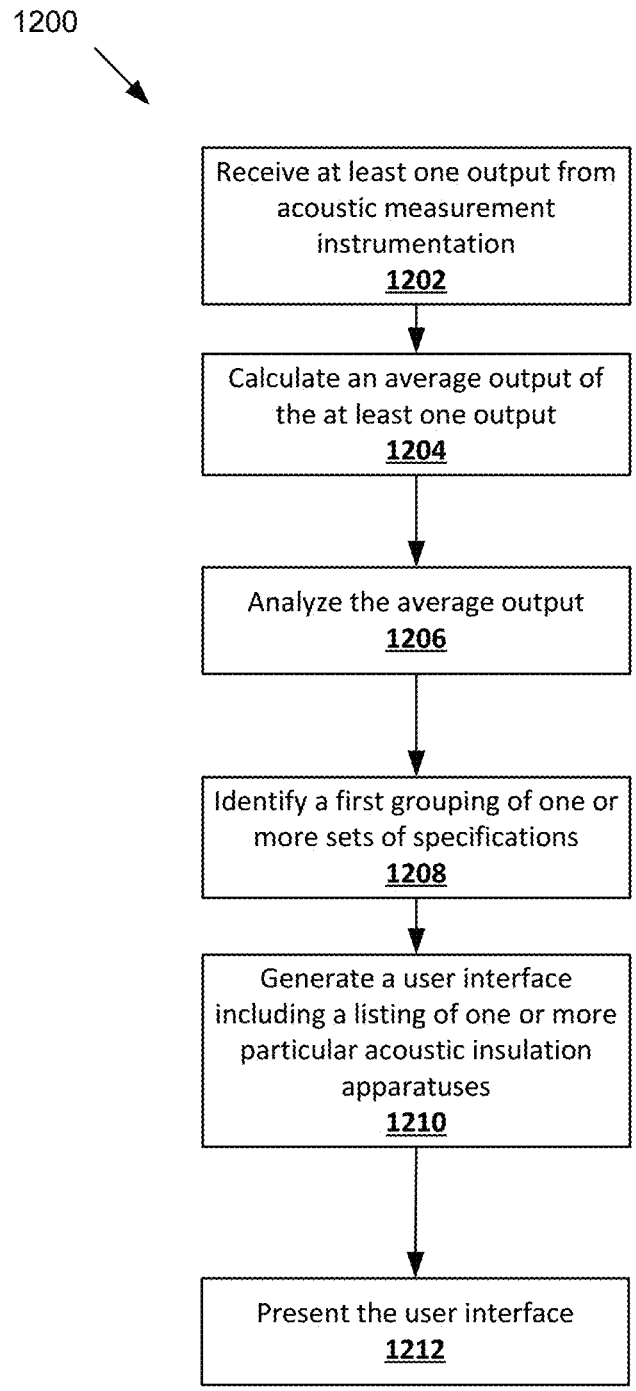
FIG. 12 is a flowchart depicting example operations performed in a method of presenting a user interface, in accordance with an embodiment of the present application.

FIG. 12 provides a flowchart depicting example operations performed in a computer-implemented method 1200 of presenting a user interface, the user interface including a listing of one or more particular sound reduction apparatuses. Operations starting with an operation 1202 and continuing onward are performed by the processor 1010 (FIG. 10) of the first computing device 810 executing software comprising instructions such as may be stored in the memory 1020 of the first computing device 810.

At the operation 1202, at least one output from acoustic measurement instrumentation is received. The at least one output represents an effect of a mass being dropped through a tube onto a floor after pulling a pin. The floor may include a subfloor and one or more floor coverings. The subfloor may be a slab. The one or more floor coverings may be a mat, such as the example mat 300 shown in FIG. 3 and described above with reference to FIG. 3. The at least one output may be obtained, for example, by the method 500, described above with reference to FIG. 5. The output may be received from the acoustic measurement instrumentation 620 of FIG. 8. The output may correspond to ambient sound levels and may be provided, for example, in decibels (dB) or in weighted decibels, such as A-weighted decibels (dBA). Additionally or alternatively, the output may correspond to ambient vibration, and may be provided, for example, in metres per second squared ($m/s^2$).

At the operation 1204, the first computing device 810 calculates an average output of the at least one output received from the acoustic measurement instrumentation. The average output may be calculated, for example, in accordance with the described method 700 of FIG. 7.

At the operation 1206, the first computing device 810 analyzes the average output. In some embodiments, analyzing the average output may include comparing the average output to one or more sets of specifications, each of the one or more sets of specifications corresponding to one or more particular acoustic insulation apparatuses. The one or more particular acoustic insulation apparatuses may include, for example, one or more types of flooring underlay, one or more types of vibration isolator, and one or more types of floor coverings. The one or more specifications may describe various features and properties of the one or more acoustic insulation apparatuses, such as corresponding isolation efficiency data, noise reduction data, installation data, size and thickness data, static deflection data, Water, Petroleum, Alkali and Fuel Resistance data, density data, data corresponding to one or more ASTM standards, feature and benefit data, pricing data, etcetera.

At the operation 1208, the first computing device 810 identifies a first grouping of one or more sets of specifications. The first grouping may include one or more particular acoustic insulation apparatuses. The first grouping may be identified based on the comparison of the average output to the one or more sets of specifications associated with the one or more identified particular acoustic insulation apparatuses. The first grouping may be identified based on a correspondence between the average output and the one or more sets of specifications associated with the one or more identified particular acoustic insulation apparatuses. The first grouping may be identified using a rule-based approach.

In some embodiments, first computing device 810 may perform operation 1204 to operation 1208 of the computer-implemented method 1200. In some embodiments, one or more of operation 1204 to operation 1208 may be delegated to and performed by a server, such as a web server, after receiving the data associated with the completion of the previous step from the first computing device 810. In such embodiments, after performing the delegated steps, the server may send the resulting data to the first computing device 810, and the first computing device 810 may then continue to perform the remaining steps of the computer-implemented method 1200.

At the operation 1210, the first computing device 810 generates a user interface. The user interface may include a listing of the one or more identified particular acoustic insulation apparatuses. In other words, the user interface may include a listing of the one or more particular acoustic insulation apparatuses associated with the one or more sets of specifications of the first grouping.

At the operation 1212, the first computing device 810 presents the user interface. For example, the first computing device 810 may present the user interface using an output module such as, for example, the I/O module 1030. For example, the first computing device 810 may use the output module to present the user interface by using the display 902 of FIG. 9, for example. The user interface may include a listing of the one or more identified particular acoustic insulation apparatuses. In other words, the user interface may include a listing of the one or more particular acoustic insulation apparatuses associated with the one or more sets of specifications of the first grouping. In this way, the user 610, or an auxiliary user, may be provided with a listing of acoustic insulation apparatuses suitable for providing the floor and/or surface 410 with acoustic insulation.

Figure 13:
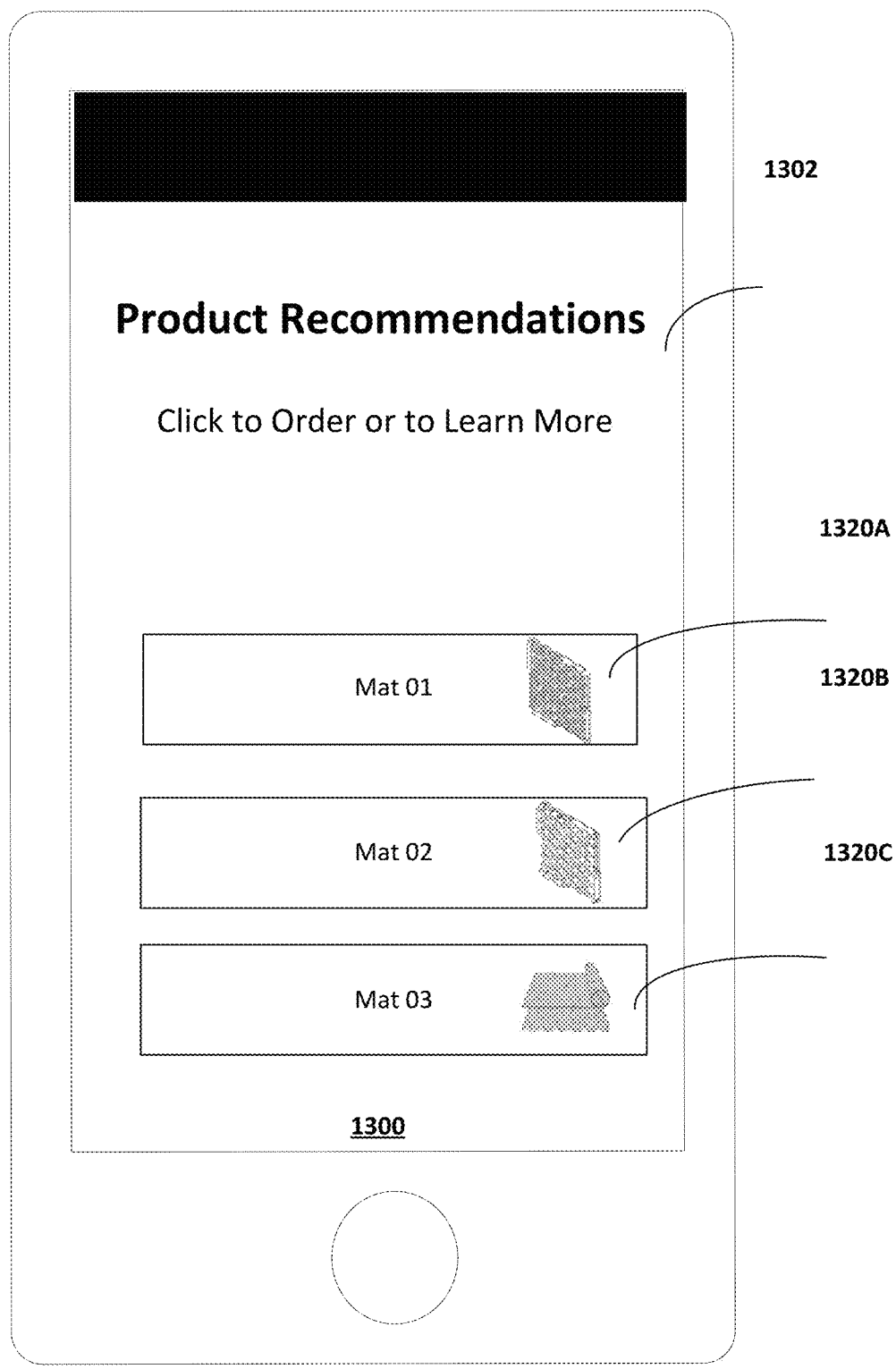
FIG. 13 shows an example user interface for use in presenting a listing of one or more identified particular acoustic insulation apparatuses, in accordance with an embodiment of the present application.

An example user interface 1300 for presenting a listing of one or more identified particular acoustic insulation apparatuses is provided in FIG. 13. The listing of one or more particular acoustic insulation apparatuses may include, for example, one or more types of flooring underlay, one or more types of vibration isolator, and one or more types of floor coverings.

As illustrated, the example user interface 1300 includes a message 1302, and identified particular acoustic insulation apparatuses indications 1320A-1320C. Each of the indications 1320A-1320C may correspond to one or more identified particular acoustic insulation apparatuses.

The user 610, or an auxiliary user, may select an indication, and this indication may be received as input by the first computing device 810. For example, such input may be received using an input module such as, for example, the I/O module 1030. The input may correspond to a HyperText Markup Language (HTML) link to a webpage containing further information about the selected one or more particular acoustic insulation apparatuses. Additionally or alternatively, responsive to the input, a software application used to initiate purchases of the one or more selected particular acoustic insulation apparatuses may be launched. Notably, it may be that the one or more selected particular acoustic insulation apparatuses corresponds one-to-one with a particular merchant. In such a case, launching a software application used to initiate purchases of the one or more selected particular acoustic insulation apparatuses may correspond to launching an application supplied by and/or corresponding to that particular merchant.

The received input may take a variety of forms. For example, input may be received interacting with an indication such as, for example, the indications 1320A-1320C. In a particular example, where the display 902 is a touchscreen, the received input may correspond to a touch interaction with an indication.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

We claim:

1. A method for measuring acoustic properties of a surface, the method comprising the steps of:
 a) providing acoustic measurement instrumentation beneath the surface;
 b) placing a mat upon the surface;
 c) positioning a tube upon the mat, a length of the tube being perpendicular to the surface, the tube having at least one pair of diametrically opposing holes;
 d) positioning an elongated pin through a first pair of the at least one pair of diametrically opposing holes;
 e) positioning a mass within the tube such that the mass rests upon the elongated pin;
 f) removing the elongated pin from the tube such that the mass falls through a bottom portion of the tube onto the mat thereby providing input to the acoustic measurement instrumentation;
 g) obtaining a first resulting output by the acoustic measurement instrumentation;
 repeating steps c) through f) a predetermined number of times;
  obtaining a subsequent resulting output by the acoustic measurement instrumentation for each repetition;
 receiving, by a computing device, the first resulting output and each of the subsequent outputs; and
  determining an average resulting output by averaging the first resulting output and each of the subsequent outputs;
   comparing the average resulting output to one or more sets of specifications, each of the one or more sets of specifications corresponding to one or more particular acoustic insulation apparatuses;
   generating a user interface including a listing of one or more particular acoustic insulation apparatuses; and
  presenting the user interface via the computing device.

2. The method of claim 1, wherein the predetermined number of times is one time such that steps c) through f) are repeated one time and the average result is determined by averaging the first resulting output and a second resulting output.

3. The method of claim 1, wherein the predetermined number of times is two times such that steps c) through f) are repeated two times and the average result is determined by averaging the first resulting output, a second resulting output and a third resulting output.

4. The method of claim 1, wherein the surface is a slab floor.

5. The method of claim 1, wherein the mat is formed of an elastomer and has a generally planar upper facing.

6. The method of claim 1, wherein the tube has more than one pair of diametrically opposing holes to allow the elongated pin to be placed at different heights.

7. The method of claim 1, wherein the mass is a sphere.

8. The method of claim 1 wherein the tube, the elongated pin, the mass, and the mat have a combined weight that does not exceed 30 kilograms.

* * * * *